United States Patent [19]

Betensky

[11] Patent Number: 5,313,330
[45] Date of Patent: May 17, 1994

[54] ZOOM PROJECTION LENS SYSTEMS

[75] Inventor: Ellis I. Betensky, Redding, Conn.

[73] Assignee: U.S. Precision Lens Incorporated, Cincinnati, Ohio

[21] Appl. No.: 938,381

[22] Filed: Aug. 31, 1992

[51] Int. Cl.⁵ .............................................. G02B 15/14
[52] U.S. Cl. .................................... 359/676; 359/739; 359/740
[58] Field of Search ............... 359/676, 683, 684, 687, 359/739, 740

[56] References Cited

U.S. PATENT DOCUMENTS

| | | | |
|---|---|---|---|
| 3,920,315 | 11/1975 | Linke | 359/686 |
| 4,411,488 | 10/1983 | Neil | 359/354 |
| 4,623,226 | 11/1986 | Fujii | 359/690 |
| 4,632,498 | 12/1986 | Neil | 359/354 |
| 4,659,171 | 4/1987 | Neil | 359/354 |
| 4,676,581 | 6/1987 | Roberts | 359/354 |
| 4,695,119 | 9/1987 | Neil | 359/353 |
| 4,705,363 | 11/1987 | Ikemori | 359/687 |
| 4,708,444 | 11/1987 | Tsuji | 359/684 |
| 4,749,265 | 6/1988 | Hattori et al. | 359/683 |
| 4,838,669 | 6/1989 | Ogata et al. | 359/692 |
| 5,101,299 | 3/1992 | Iwasaki | 359/683 |
| 5,114,238 | 5/1992 | Sigler | 359/354 |

FOREIGN PATENT DOCUMENTS 3-293612 12/1991 Japan.
4-83215 3/1992 Japan.
4-172416 6/1992 Japan.

OTHER PUBLICATIONS

E. Betensky, "Zoom Lens Principles and Types", SPIE, vol. CR41, Warren J. Smith, Editor, pp. 88-116, 1992 (presented Jan. 1992).

I. A. Neil, "Use of Chalcogenide Glass in Thermal Infrared Telescopes," 1980 International Lens Design Conference (OSA), SPIE, vol. 237, p. 429.

Primary Examiner—Scott J. Sugarman
Attorney, Agent, or Firm—Maurice M. Klee

[57] ABSTRACT

Zoom projection lens systems are provided which have 1) an entrance pupil which remains at a substantially fixed position as zooming takes place, and 2) a operative aperture stop, distinct from the system's physical aperture stop, which moves through lens surfaces as zooming takes place. The fixed entrance pupil allows for efficient coupling to a light source throughout the magnification range of the system. Methods which can be used to design and produce zoom lens systems of this type and which employ a pseudo-aperture stop are also disclosed.

36 Claims, 8 Drawing Sheets

ZOOM PROJECTION LENS SYSTEMS

FIELD OF THE INVENTION

This invention relates to projection lens systems and, in particular, to zoom projection lens systems.

BACKGROUND OF THE INVENTION

Figure 8:
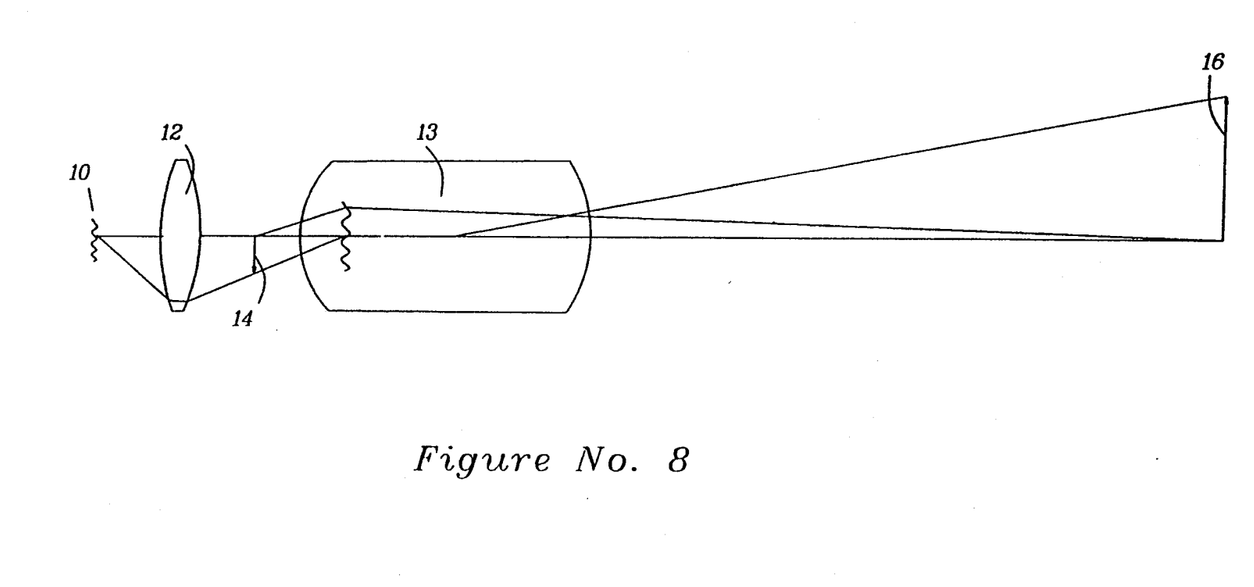
FIG. 8 is a schematic diagram showing an overall projection system in which the zoom projection lens systems of the present invention can be used.

As is well known, projection lens systems are used to form an image of an object on a viewing screen. The basic structure of a projection lens system is shown in FIG. 8, wherein 10 is a light source (e.g., a tungsten-halogen lamp), 12 is illumination optics which forms an image of the light source (hereinafter referred to as the "output" of the illumination system), 14 is the object which is to be projected (e.g., a matrix of on and off pixels of a LCD panel), and 13 is a projection lens system which forms an enlarged image of object 14 on viewing screen 16.

Viewing screen 16 can be viewed from the front or the back depending upon the particular application of the projection lens system. Also, instead of being viewed, the image can be recorded on a recording medium, e.g., film, in such applications as a photographic enlarger.

For many applications, the light source, the illumination optics, and the location and size of the both the object and image are fixed. For a variety of other applications, however, it is desirable to be able to vary the size and location of the image. In particular, projection lens systems often need to be used with different size screens or in rooms having different dimensions. The parameters of this problem are often expressed in terms of providing variable image distance to image width ratios, which typically run in the range from 7:1 to 1.5:1 (hereinafter the "ID-IW ratio").

In the past, various approaches have been used to vary the ID-IW ratio. The most basic approach has been to use a set of interchangeable fixed focal length projection lens systems with a particular member of the set being chosen to match the ID/IW value of a particular room/viewing screen configuration. The disadvantages of this approach include the facts that only a finite number of ID-IW ratios can be satisfied so that in general the image size is smaller than the projection screen, the setup time for the system is often significant, and the number of components which must be transported and stored is large.

To avoid these problems, zoom projection lens systems have been developed in the art. See, for example, U.S. Pat. No. 3,920,315. These lens systems have followed zoom lens technology developed in the area of "taking" or "objective" lenses, e.g., camera lenses. Examples of such zoom taking lenses can be found in, for example, E. Betensky, "Zoom Lens Principles and Types", *SPIE*, Vol. CR41, Warren J. Smith, Editor, 1992.

The zoom projection lens systems which have followed the taking lens approach have employed a zooming unit, a compensating unit, a focusing unit which has been either separate from or part of the compensating unit, and a fixed unit containing an aperture stop. As a result, these zoom projection lens systems have been highly complex containing many lens elements. Also, for low ID/IW values, these design forms would require excessively large diameters for the lens elements which would significantly increase manufacturing costs.

Zoom lens objectives have been developed for camera applications which employ a moving physical aperture stop. Such a stop can be used to minimize both element size and aberration variation during zooming. Reduced aberration variation, in turn, reduces lens complexity. By means of this approach, significant simplification in terms of both economy of elements and motions of elements has been achieved. See U.S. Pat. No. 4,838,669. A related approach has employed multiple physical stops at different locations in the zoom lens system, with different stops controlling the aperture and vignetting of the system as zooming takes place. See U.S. Pat. No. 4,749,265.

As discussed in detail below, in accordance with the invention, it has been determined that the moving aperture stop approach is not suitable for zoom projection lens systems. Specifically, such a stop generally results in a moving entrance pupil which leads to a variety of problems when used with fixed illumination optics having an output at a fixed location, the most serious of which is that small ID/IW values cannot be achieved. Although multiple physical aperture stops can in theory be used to address the moving entrance pupil problem, the result of this approach would be an unnecessarily complex and expensive zoom projection lens system.

The problems resulting from a zoom projection lens system having a moving physical aperture stop can be addressed by using illumination optics having a moveable output location. However, this simply transfers the problem to the illumination portion of the overall projection system making that portion complex. In addition, illumination systems having moveable outputs are inefficient in terms of illumination at the viewing screen per unit of energy consumed, i.e., higher wattage lamps must be used to achieve the same level of screen illumination.

Zoom projection lens systems specifically designed for use with LCD panels have been disclosed in Japanese Patent Publications Nos. 4-172416, 4-83215, and 3-293612. The '416 publication uses the classical approach of a fixed aperture stop and thus the resulting lens system is highly complex including four units and ten elements. The '215 publication has a moving aperture stop resulting in a moving entrance pupil which limits its ability to achieve low ID/IW values. The '612 publication similarly has a moving aperture stop and thus entrance pupil which again limits the range of ID/IW values. Moreover, the lens systems of this publication exhibit variations in light level at the screen as the lens is zoomed.

Projection systems which employ LCD panels present special problems for a zoom projection lens system. For example, beam splitting optics are often used with LCD panels so that three colors can be projected using one projection lens system. For these applications, there needs to be a large space between the object and the first lens element of the zoom projection lens system.

The corresponding problem for a taking or objective lens involves creating a large back-focal-length to focal-length ratio. For wide angle taking lenses, an inverted telephoto design composed of a negative first unit followed by a positive second unit containing an aperture stop can be used for this purpose. Such lenses, however, always have a moving exit pupil, or entrance pupil in projection lens terminology. This means that conventional inverted telephoto zoom lenses cannot be directly applied to the problem of providing a large space between the object and the first element of a zoom projection lens system.

Another problem associated with zoom projection lens systems which are to be used with LCD panels, as well as in other applications, is that in some cases it is necessary for the entrance pupil to be at infinity or at least at a great distance from the object, a condition referred to as telecentric. This is either to minimize the angle of the principal ray at the object, or to minimize the change of magnification for an out of focus condition. To achieve this condition, the aperture stop is usually placed at the back focus position of the rear lens unit. Depending upon the size of the object, and the distance from the object to the first lens surface, the back focus position could be a considerable distance from the rear lens unit, thus requiring a large physical size for the lens barrel. In the case of a zoom projection lens system designed in accordance with prior art approaches, this problem is exacerbated because the moving elements would have to be on the image side of the aperture stop.

SUMMARY OF THE INVENTION

In view of the foregoing state of the art, it is an object of this invention to provide improved zoom projection lens systems.

More particularly, it is an object of the invention to provide zoom projection lens systems having an entrance pupil which remains at a substantially fixed location over the zoom range of the system.

It is a further object of the invention to provide zoom projection lens systems of the foregoing type which have one or more and preferably most or all of the following features: 1) the ability to provide a relatively wide and continuous range of ID/TW values; 2) the ability to provide a relatively wide angular coverage; 3) a relatively low f-number; 4) a relatively simple overall structure employing a relatively small number of lens elements; 5) a structure which employs lens elements having relatively small diameters; and 6) a structure which employs a relatively small number of aspheric surfaces.

To achieve the foregoing and other objects, the invention employs a process for designing zoom lens systems not previously used in the art. In the past, designers of zoom lens systems, including projection zoom lens systems, have uniformly specified that the lens system have one and, in some cases, more than one stop. See the discussion of zoom lens systems set forth above.

That is, in doing their computer analysis of candidate lens systems, practitioners in the art have specified a location for at least one physical aperture stop. In part, this approach has been followed because lens design computer programs require an aperture stop location as part of the input information provided by the user. This information is required since lens design computer programs use the aperture stop to take account of the physical limitation that an optical system can only accept a limited cone of light.

This physical limitation, in turn, has caused prior designers not to question the need for a physical aperture stop in their lens designs. Thus, as the discussion of zoom lens systems set forth above shows these prior designers have included fixed physical aperture stops, moving physical aperture stops, and multiple physical aperture stops in the lens systems they have designed. In each case, the inclusion of a physical aperture stop or stops has limited the performance and/or simplicity of the resulting lens system.

In accordance with the invention, it has been determined that the location of a physical aperture stop or stops does not need to be specified in designing zoom projection lens systems. Rather, the critical design parameter is the location of the projection lens system's entrance pupil. To achieve efficient light transmission, the location of this pupil should be 1) substantially the same as the location of the output of the illumination system with which the projection lens system is to be used, and 2) its location should not substantially change as zooming takes place. Thus, in accordance with the present invention, it is the location of the zoom projection lens system's entrance pupil which is specified, not a location of a physical aperture stop.

With this approach, the zoom projection lens system still has a physical aperture stop, but that aperture stop is not the "operative" aperture stop which determines the performance of the projection lens system. In particular, as used herein, the physical aperture stop is defined as that element of the projection lens system which limits the amount of light which can pass through the system from a Lambertian point source located at the intersection of the system's optical axis with the object plane, e.g., the plane where, for example, a LCD panel is located in a projection television application of the invention.

That is, the physical aperture stop is the lens element which defines the projection lens system's numerical aperture, where numerical aperture, as is conventional, is the sine of the half-angle of the widest bundle of rays capable of entering the lens system, multiplied by the index of refraction of the medium containing that bundle of rays, e.g., 1.0 for a lens system used in air. As zooming takes place, this physical aperture stop will, in general, remain at a fixed location. For highly complex zoom projection lens systems containing multiple moving groups, the physical aperture stop may in some cases jump from one lens element to another element as the magnification of the system changes.

In addition to a non-operative physical aperture stop, the zoom projection lens systems of the present invention also have an "operative" aperture stop. By definition, the entrance pupil, exit pupil, and aperture stop of an optical system are conjugates of one another so that a principal ray aimed at the center of the entrance pupil will intersect the optical axis at the location of the aperture stop and then at the location of the exit pupil. Accordingly, specifying the location of the entrance pupil defines a location for the aperture stop. It is this aperture stop which is the "operative" aperture stop of the zoom projection lens systems of the present invention. That is, in the present invention, the location of the lens system's entrance pupil is fixed at the location of the output of the illumination system and the image of that entrance pupil in lens space is the operative aperture stop.

The operative aperture stop does not stay at a fixed location as zooming takes place. Rather, as the locations of the lens units and/or elements making up the zoom projection lens system change during zooming, the location of the operative aperture changes, even though the location of the entrance pupil remains constant. Indeed, as zooming takes place, the operative aperture stop moves up to and passes through lens surfaces in a continuous manner.

The operative aperture stop is in general smaller than the physical aperture stop over the entire zoom range of the projection lens system. In some cases, however, depending upon the design of the lens system, the operative aperture stop and the physical aperture can coincide at some point in the zoom range, in which case the two stops may have the same size.

It should be noted that because the operative aperture stop is not the physical aperture stop, the zoom projection lens systems of the present invention are not suitable for use as taking lenses since when used as a taking lens, the physical aperture stop would be the operative aperture stop which is not how the lens was designed to be used. That is, the zoom lens systems of the invention are designed to be used with an illumination system having an output at a specified location and when not used with such an illumination system, e.g., if used as a taking lens, they do not, in general, produce acceptable images. Indeed, testing of the zoom projection lens systems of the invention needs to be done with the illumination system with which the lens system is to be used, as opposed to testing the system in a taking lens format as done with conventional zoom lens systems.

As mentioned above, optical design computer programs require an aperture stop to take account of the physical limitation that an optical system can only accept a limited cone of light. It is important to note that zoom projection lens systems designed and built in accordance with the present invention satisfy this physical limitation even though 1) the system's physical aperture stop is not its operative aperture stop, and 2) a physical aperture stop is not used in the design process (see below). Specifically, the illumination system will be designed so as to produce an output at the entrance pupil of the zoom projection lens system which is approximately equal to the size of that pupil. Accordingly, a physical aperture stop is not needed since the light entering the projection lens system is self limited.

The present invention can be practiced with conventional optical design computer programs without reprogramming even though those programs require the user to specify the location of the aperture stop. This is done by means of what will be referred to herein as a "pseudo-aperture stop." That is, a pseudo-aperture stop is specified which 1) is in the object or image space of the zoom projection lens system, and 2) has the same location as the output of the illumination system. Since the aperture stop and entrance pupil are conjugates and since the pseudo-aperture stop is in object space where there are no lens elements, this procedure causes the entrance pupil to be at the location of the output of the illumination system as desired for efficient coupling of light between the illumination system and the zoom projection lens system.

Since optical design convention assumes that light travels from the long conjugate of an optical system towards the short conjugate and since this direction is backwards from the direction used in the foregoing discussion, in the actual design process, the pseudo-aperture stop will typically be specified in image space and it will be the location of the lens system's exit pupil which is controlled to achieve the desired efficient coupling of light.

In view of the foregoing, in accordance with certain of its aspects, the present invention provides a zoom projection lens system for use with a predetermined illumination means, said system forming a well-corrected, real image of an object and having an optical axis, an entrance pupil, a physical aperture stop which defines the system's numerical aperture, and an operative aperture stop whose location is defined by the intersection with the optical axis of a ray from the illumination means aimed at the center of the entrance pupil, said system comprising:

(a) at least two lens units each comprising at least one lens element, said at least two lens units being separated by at least one axial space; and (b) zoom means for varying the system's magnification between a maximum and a minimum magnification by changing the at least one axial space;

wherein as the zoom means varies the system's magnification between the maximum and minimum magnifications:

(i) the entrance pupil remains at a substantially fixed position relative to the illumination means over the zoom range;

(ii) the operative aperture stop moves through at least one lens element surface; and (iii) the physical aperture stop and the operative aperture stop are at different locations for at least one magnification between said maximum and minimum magnifications.

In accordance with other aspects of the invention, a method of producing a zoom projection lens system for use with illumination means which produces an output at a predetermined location is provided wherein the system produces a well-corrected, real image of an object and has an optical axis and an entrance pupil and the method comprises:

(a) designing the zoom projection lens system by:

(1) specifying at least two lens units which are separated by at least one axial space and which each comprise at least one lens element, said at least one axial space being variable so as to change the system's magnification between a maximum and a minimum magnification;

(2) specifying the location of the system's entrance pupil to be substantially the same as the predetermined location of the output of the illumination means over the system's zoom range; and (3) not specifying the location of the system's physical aperture stop which defines the system's numerical aperture;

whereby the system has an operative aperture stop whose location is defined by the intersection with the optical axis of a ray from the illumination means aimed at the center of the entrance pupil, said location moving through at least one lens surface as the system's magnification varies between the maximum and minimum magnifications; and (b) producing the lens system designed in step (a).

In the preferred embodiments of the invention, step (a) is performed using a pseudo-aperture stop as discussed above.

As used herein the term "lens unit" means one or more adjacent lens elements which together perform a particular optical function, e.g., zooming, compensating, focusing, field flattening, or the like. In most embodiments of the invention, the lens elements making up a lens unit do not move relative to one another, although in certain embodiments, lens units may have subunits which move during all or a part of zooming or focusing. Similarly, in most embodiments of the invention, lens units will move relative to one another, although in some embodiments, two or more units may remain at fixed locations relative to one another during all or a part of zooming or focusing.

The accompanying drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

As discussed above, the present invention relates to projection zoom lens systems having entrance pupils which remain at substantially a fixed location as the system zooms between its minimum magnification ($m'_{min}$) and its maximum magnification ($m'_{max}$).

In its most simple execution, the lens system includes two lens units with the first unit (object side unit) having a positive power and the second unit (image side unit) a negative power. Movement of the first unit serves to change the magnification of the system between $m'_{min}$ and $m'_{max}$. As is conventional for a zoom lens employing one positive zooming unit, the range of magnification ($m'_{min}$ to $m'_{max}$) is centered around $-1.0$, with $m'_{min}$ being approximately equal to $1/m'_{max}$.

The second (image side) unit provides compensation for the change of focus position caused by movement of the first unit and defines the overall focal lengths of the system. Also, the second unit can be used independently for focusing at different image distances, e.g., different screen distances.

If desired, additional lens units can be employed in the practice of the invention to allow for telecentric systems, efficient correction of extended focal length ranges, minimization of lens element size, and minimization of barrel length.

As discussed above, the key to designing the zoom projection lens systems of the present invention is specifying the location of the system's entrance pupil, but not specifying the location of its physical aperture stop. For conventional lens design computer programs, this is preferably done through the use of a pseudo-aperture stop.

Specifically, in using the computer program, the aperture stop called for by the program is placed in object space at the desired location of the zoom projection lens system's entrance pupil. Alternatively, as in the case of a telecentric zoom projection lens system designed to be used with an illumination system whose output is located a long distance in front of the object (see Example 7 below), the aperture stop is placed in image space. In either case, before passing through the aperture stop, the computed path of the light must pass through all lens surfaces (i.e., it must be in object space or image space as opposed to lens space) so that the aperture stop will be its own conjugate, i.e., so that the entrance pupil and the aperture stop will coincide. This aperture stop which is placed in object or image space is the pseudo-aperture stop.

Typically, the desired location for the entrance pupil and thus of the pseudo-aperture stop will physically be within the space between the first and last lens surfaces, i.e., the physical location of the pseudo-aperture stop will be in lens space. To transform this physical location into object or image space, negative spacings between the calculation surfaces used by the computer program are employed.

That is, in the case where the pseudo-aperture stop is to be in object space, a computed light path is used wherein light passes through the pseudo-aperture stop, then goes backwards to the first lens surface (thus the negative spacing), and then passes through that surface and all the rest of the lens surfaces on its way to the screen. In the case of a pseudo aperture stop in image space, the light goes through the lens elements, then goes backwards from the last lens surface to the pseudo-aperture stop by means of a negative spacing, and then proceeds on to the screen. (As noted above, in practice, rays are traced from the long conjugate to the short conjugate, i.e., from the screen to the object, so that the computed light paths just described correspond to reading a standard lens prescription table from the highest calculation surface to the lowest calculation surface, i.e., from the bottom up in Tables 1-7 below.)

This pseudo-aperture stop/negative-spacing-between-calculation-surfaces approach is illustrated by the zoom projection lens systems of Examples 1-7. Tables 1-7 show the surfaces used in the design process. In each case, there is a calculation surface whose spacing from the preceding surface is negative (i.e., surfaces 16, 18, 18, 16, 18, 20, and 1 in Tables 1-7, respectively). The pseudo-aperture stop is located at this surface in each of these examples.

A variety of commercially available lens design computer programs can be employed in the practice of the invention, e.g., the program sold by Optical Research Associates, Pasadena, Calif., under the trademark CODE V. Non-commercially available systems, of course, can also be used.

In accordance with the method aspects of the invention, zoom projection lens systems following the principles of the invention are produced. Such production is performed using lens fabrication and assembly procedures well known in the art. The invention, of course, can also be practiced using fabrication and assembly procedures which may be developed in the future. General discussions of applicable manufacturing techniques can be found in, for example, *The Handbook of Plastic Optics*, 2nd edition, U.S. Precision Lens Inc., Cincinnati, Ohio, 1983, and Horne, Douglas F., *Optical Production Technology*, 2nd ed., Adam Hilger, Ltd., Bristol, 1983, the relevant portions of which are incorporated herein by reference.

Without intending to limit it in any manner, the present invention will be more fully described by the following Examples 1-7. FIGS. 1-7 and Tables 1-7 correspond to these examples. The glasses and plastics referred to in Tables 1-7 are set forth in Table 8, where the glass names are the SCHOTT designations and the abbreviation "polysty" has been used for polystyrene. Equivalent glasses made by other manufacturers can be used in the practice of the invention. The aspheric coefficients set forth in the tables are for use in the following equation:

$$z = \frac{cy^2}{1 + [1 - (1 + k)c^2y^2]^{\frac{1}{2}}} + ADy^4 + AEy^6 + AFy^8 + AGy^{10} + AHy^{12} + AIy^{14}$$

where z is the surface sag at a distance y from the optical axis of the system, c is the curvature of the lens at the optical axis, and k is a conic constant.

The abbreviations used in the tables are as follows: SN - surface number; CLR. AP. - clear aperture; EFL - effective focal length; and ZP - zoom position. All dimensions given in the tables are in millimeters.

Table 9 shows the location (Dist.) and diameter (Dia.) of the physical aperture stop (by surface number S), the operative aperture stop (by surface number S and distance (Dist.) towards the object from that surface), and the entrance pupil at the minimum (position 1) and maximum (position 2) system focal lengths for each of these examples. As shown in this table, the entrance pupil and the physical aperture stop remain at a substantially fixed location during zooming, while the operative aperture stop moves as zooming takes place.

Table 9 also sets forth Q-values for the lens systems of Examples 1-7 where the Q-value is defined by:

$$Q = (EFL_{max} * \theta)/(CA * f/no * L)$$

and where $EFL_{max}$ is the maximum value of the system's effective focal length, $\theta$ is the semi-angular coverage in degrees at the system's minimum effective focal length, CA is the clear aperture of the lens element nearest the image, f/no is the distance from the object to the system's entrance pupil divided by the diameter of the entrance pupil for entrance pupils located a finite distance from the object and f/no is one over two times the numerical aperture determined by the illumination means for entrance pupils located an infinite distance from the object, and L is the number of lens elements in the system which have optical power or correct aberrations.

The higher the Q-value the more effective is the lens system. This value takes into account the lens system's zoom range (a performance factor), the angular coverage (another performance factor), the relative aperture (a further performance factor), the lens elements' diameters (a cost factor), and the number of lens elements (another cost factor). As shown in Table 9, the zoom projection lens systems of the invention achieve Q-values above 1.0 and in many cases, above 1.5. These values indicate that the systems have a combination of relatively high performance and relatively low cost.

EXAMPLE 1

Figure 1:
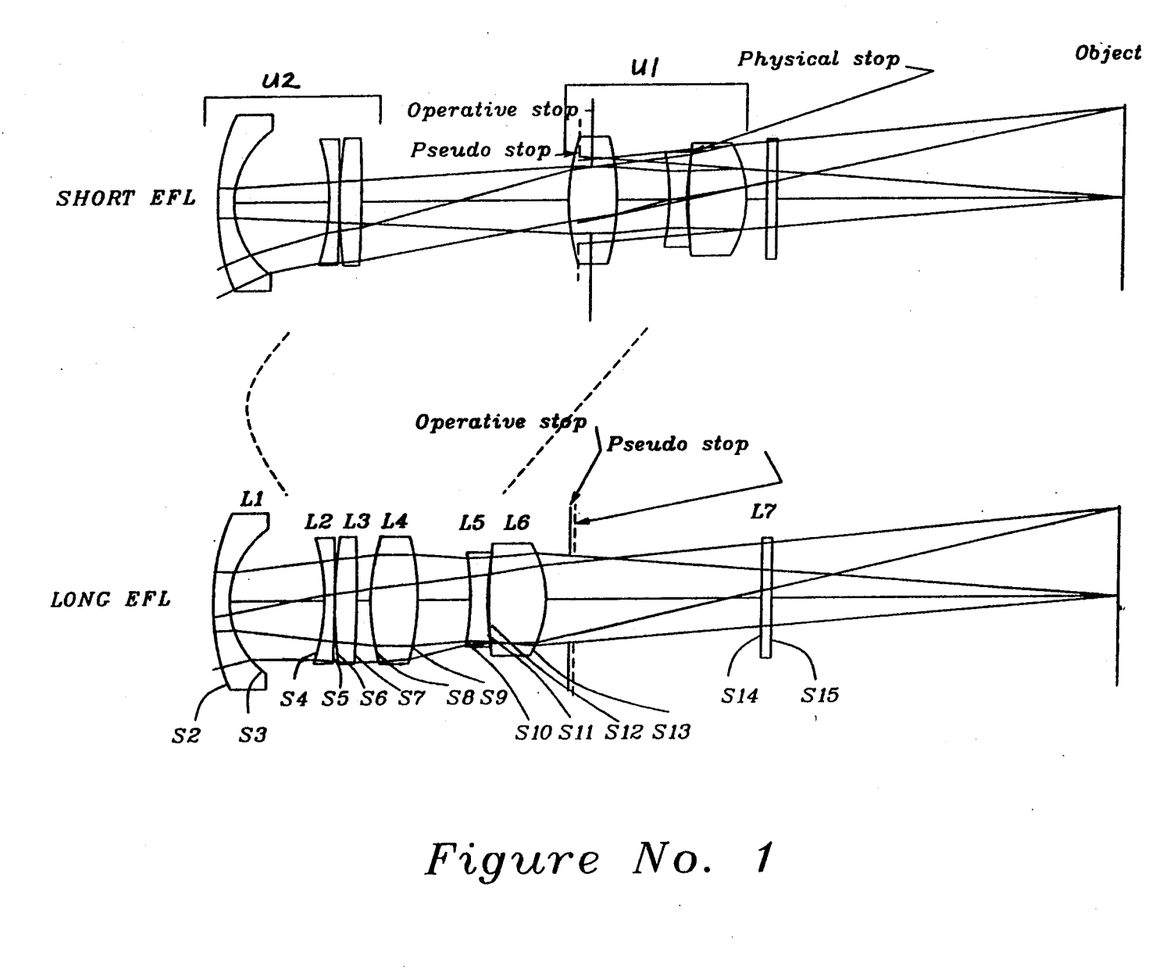
FIGS. 1 through 7 are schematic side views of zoom projection lens systems constructed in accordance with the invention. The upper portion of each of these figures shows the zoom projection lens system in its short effective focal length (EFL) configuration while the lower portion shows it in its long EFL configuration. The locations of the operative stop, the physical stop, and the pseudo stop are shown in each of the figures. L7 in FIGS. 1 and 4 and L8 in FIGS. 2, 3, and 5 are used to enclose the lens system. Each has two flat surfaces and thus no optical power.

This example illustrates a zoom projection lens system constructed in accordance with the invention having two lens units U1 and U2. The lens elements making up the two units remain at fixed locations relative to one another as the zooming takes place. That is, the zooming involves only relative movement between the two lens units.

The first (object) lens unit has positive optical power and serves to form a virtual image of the object at magnifications of −1.4 (short focal length) to −0.7 (long focal length). The operative aperture stop lies within this unit at the short focal length position, and moves through this unit to a position coincident with the entrance pupil (and the pseudo-aperture stop) as the focal length increases to its maximum value.

To achieve color correction, the first lens unit includes a negative element which as shown in FIG. 1 is located between two positive lens elements. If color correction is not required, the first unit can be further simplified by elimination of the negative element. In such a case, depending upon the application, the remaining two positive lens elements can be combined to produce a first lens unit having only a single lens element.

The second (image) lens unit has negative optical power and remains fixed between the two focal length extremes. It is used as a compensator for intermediate focal lengths and can also be used for a focus adjustment for various distances to the image.

The lens system of this example is constructed of acrylic plastic, each element having at least one aspherical surface, and dense flint glass elements, each having only spherical surfaces. For the prescription of Table 1, the system has an f-number of 6 and a total angular coverage of 52 degrees.

EXAMPLE 2

Figure 2:
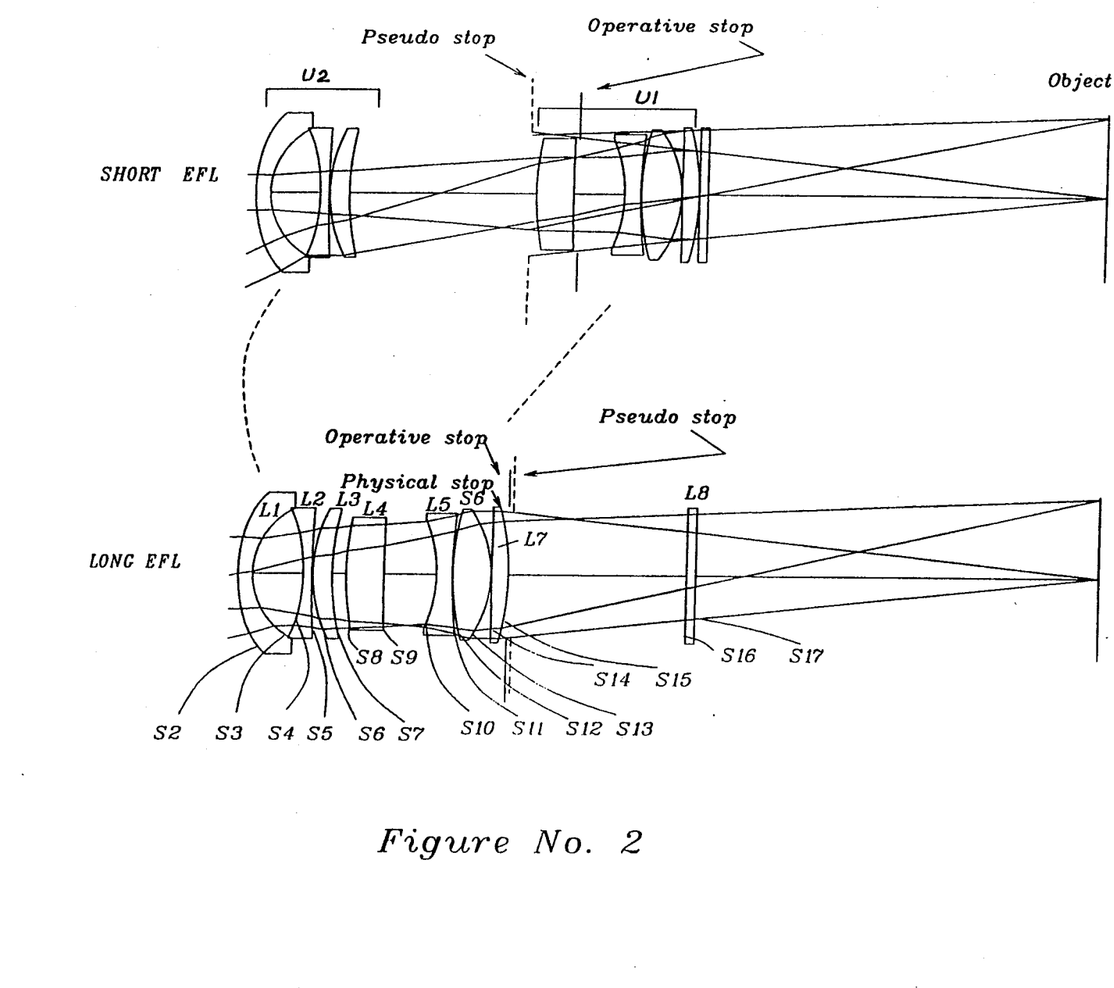

The zoom projection lens system of this example is similar to that of Example 1 and has an f-number of 6.6 and a total angular coverage of 52 degrees. An additional acrylic lens element is employed nearest the object. The operative aperture stop as defined above varies during zooming from the image side of the positive (first) unit to the object side as the focal length is increased.

EXAMPLE 3

Figure 3:
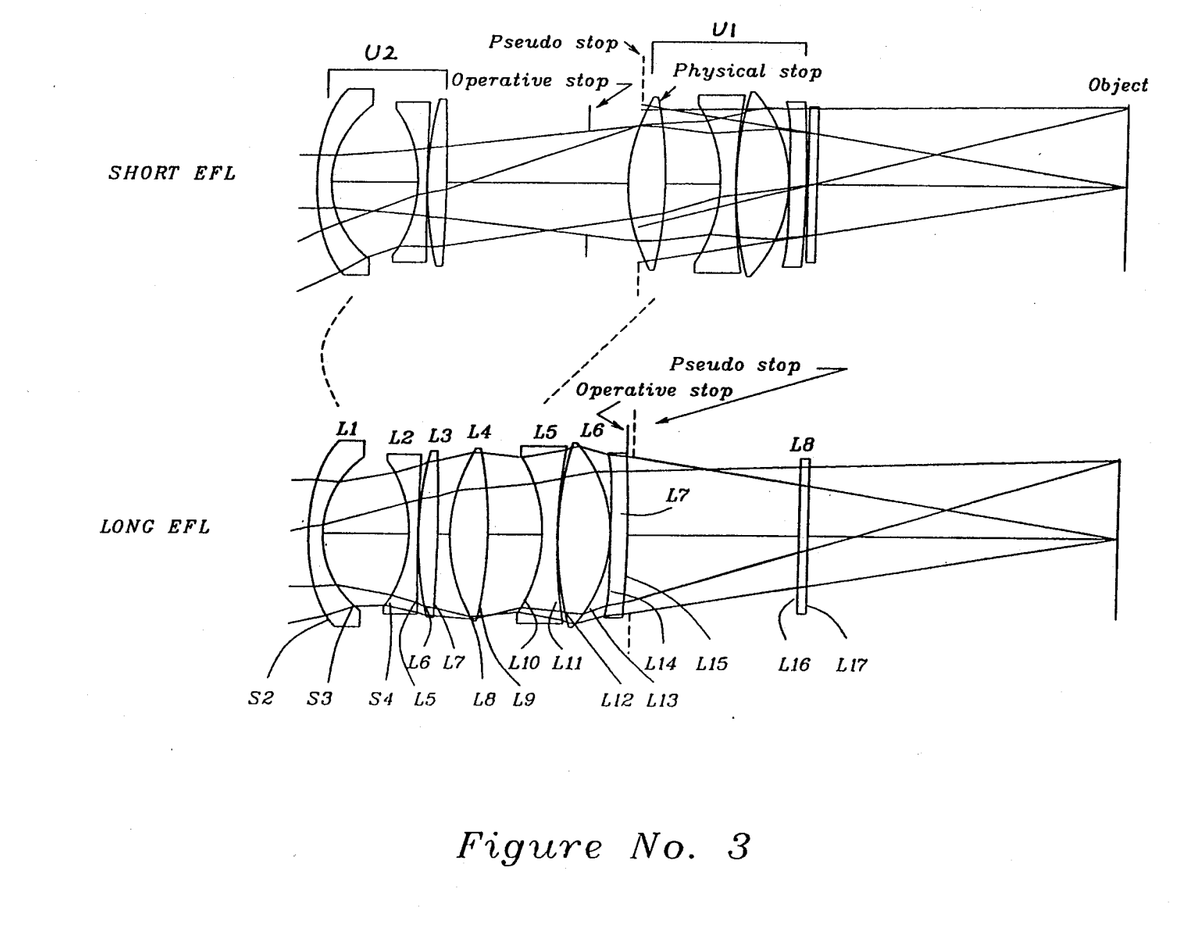

This example is similar to Examples 1 and 2 above, except that the positive (first) unit uses optical glass for a positive element in addition to the flint glass for the negative element. To provide aberration correction a weak single element of plastic having an aspherical surface is placed nearest the object. The operative aperture stop moves in a similar manner to that of Examples 1 and 2. The f-number for this example is 4.7 and the total angular coverage is 52 degrees.

EXAMPLE 4

Figure 4:
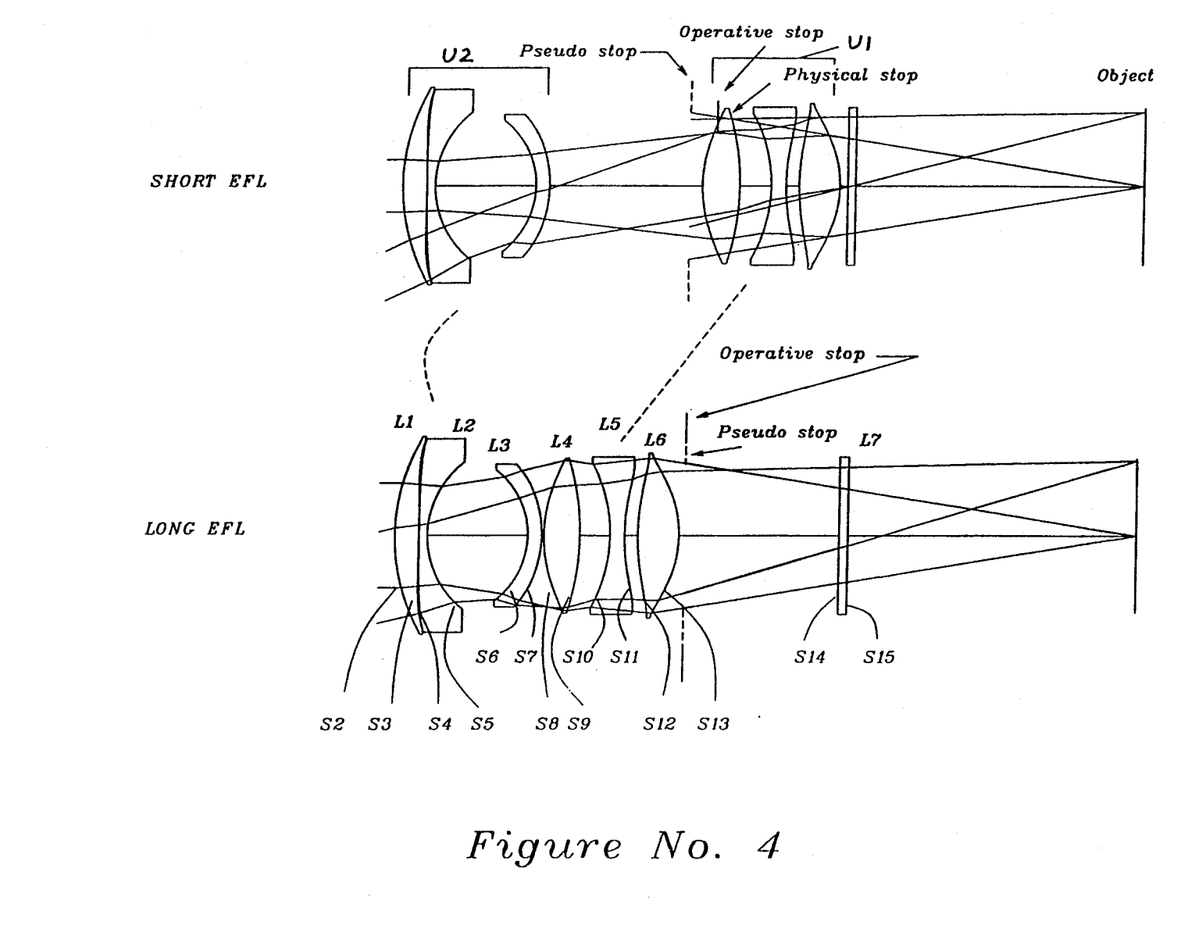

This example is a similar to the examples above. It illustrates the practice of the invention with only plastic elements. The positive (first) unit has a three element, positive, negative, positive construction. The negative (second) unit is in inverted order from the preceding examples. The f-number for the system is 4.7 and the total angular coverage is 52 degrees.

EXAMPLE 5

Figure 5:
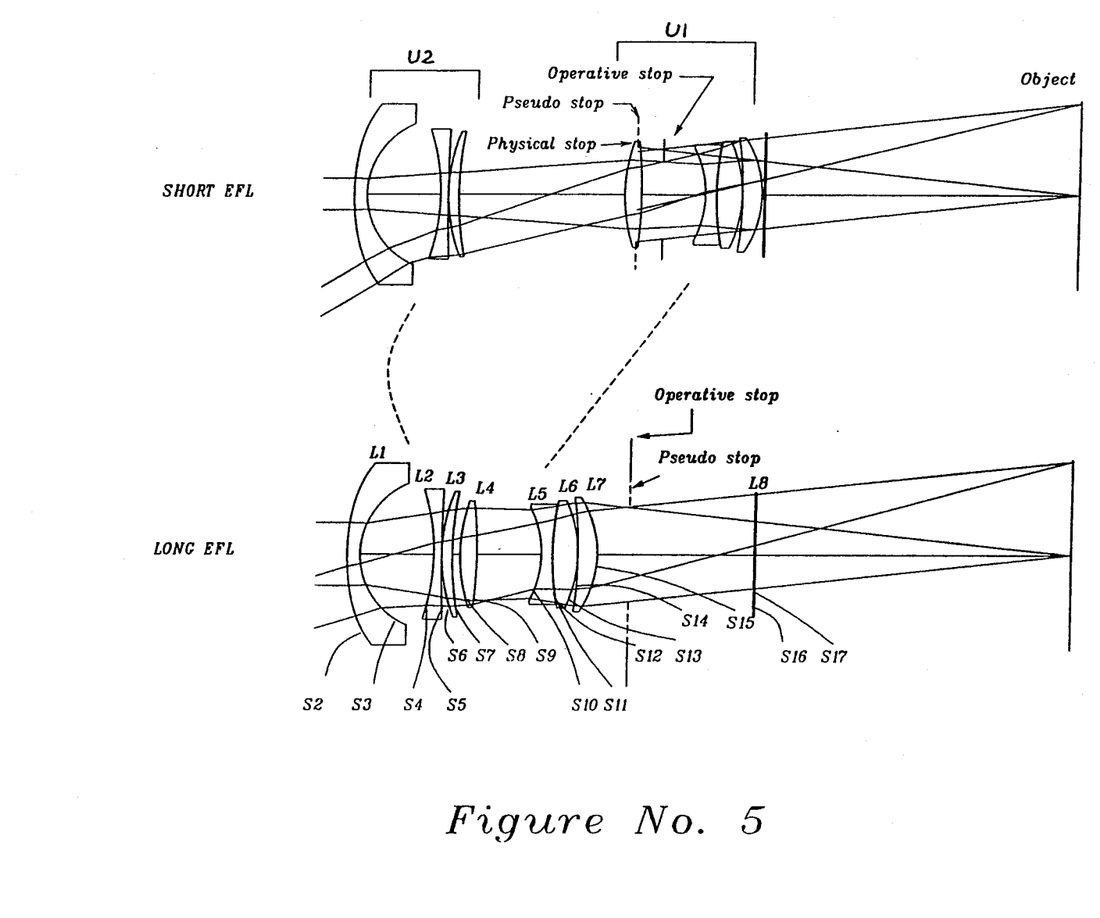
Figure 6:
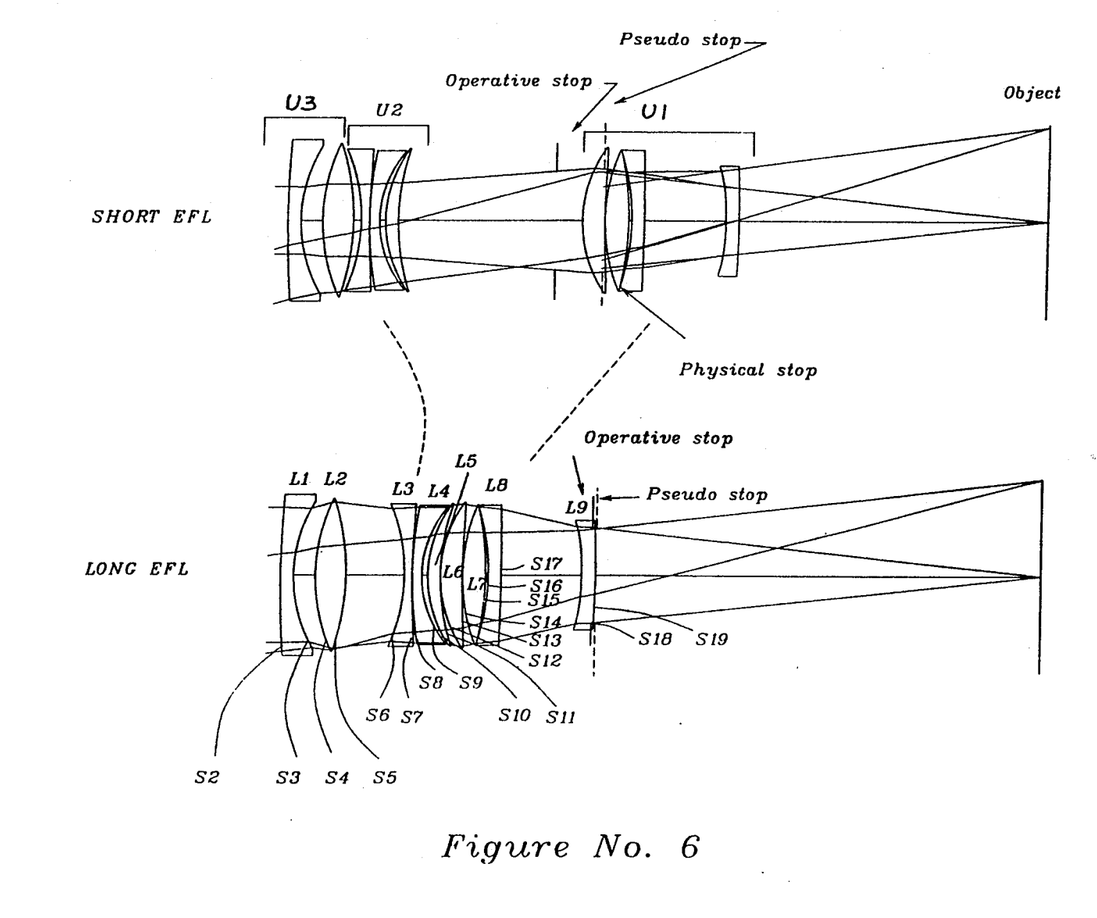

This example is similar to Example 3 above, except that the total angular coverage is 64.5 degrees, rather than 52 degrees as in Example 3. Four aspherical plastic surfaces are used to correct aberrations, and the system achieves an f-number of 4.5.

EXAMPLE 6

The zoom projection lens system of this example employs three lens units, namely, a first (object end) positive zooming unit, a second negative zooming unit, and a third (image end) positive unit which remains fixed during zooming and focusing. The first unit has a reverse telephoto construction for light traveling form right to left in FIG. 6. The f-number for the system is 4.5 and the total angular coverage is 35 degrees.

EXAMPLE 7

Figure 7:
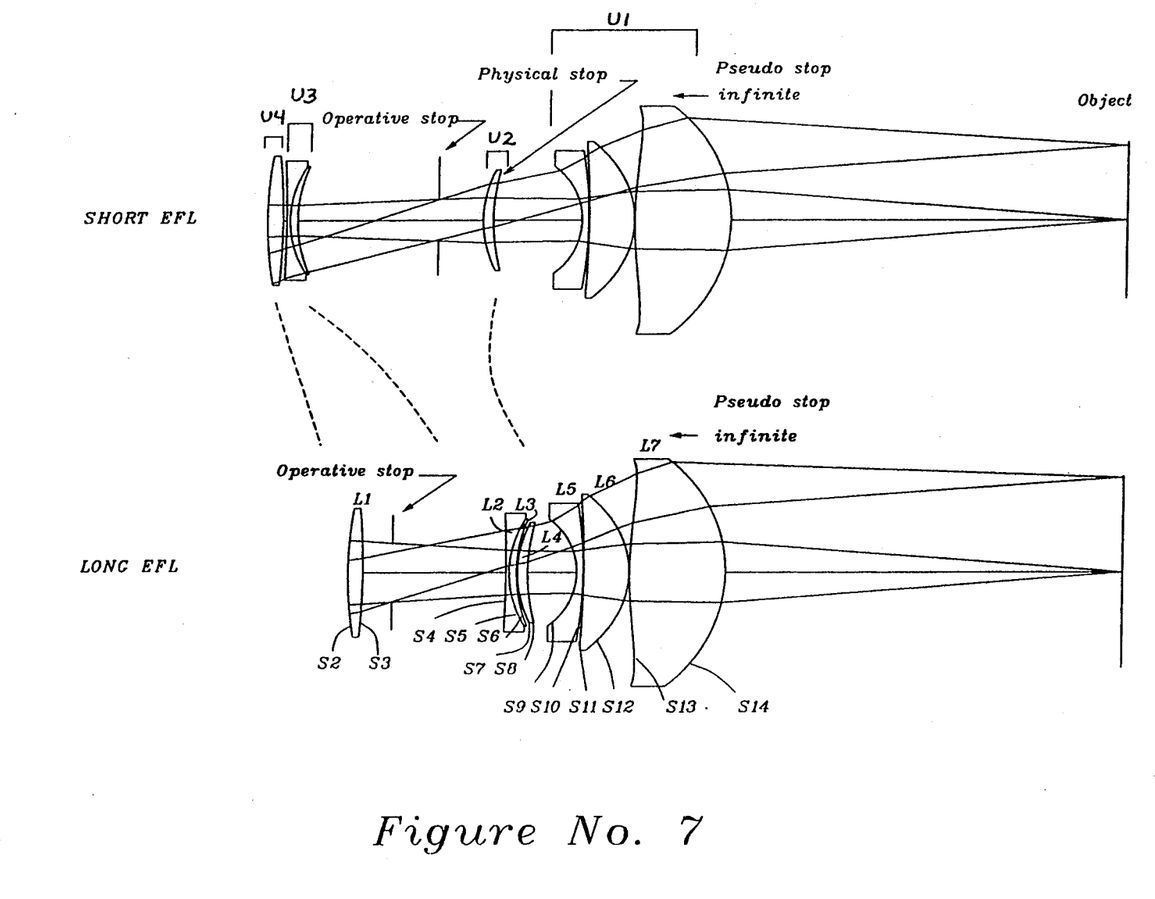

The zoom projection lens system of this example has a distance entrance pupil. The unit nearest the object has positive power and remains fixed in location. Different lens configurations can be placed on the image side. The example shows a positive singlet followed by a negative doublet and another positive singlet, all three units moving for change of focal length. The location of the operative aperture stop as defined above varies between the two sides of the negative unit during zooming. The unit nearest the object is fixed because any motion would cause it to be larger in diameter, or violate the space required between the lens system and the object. Because this unit has the largest elements, it is the most expensive to manufacture. By using interchangeable zooming units, more than one focal length range can be realized without having to duplicate the expensive unit nearest the object. The f-number for the embodiment of Table 7 is 6.3 and the total angular coverage is 42 degrees.

Although specific embodiments of the invention have been described and illustrated, it is to be understood that a variety of modifications which do not depart from the scope and spirit of the invention will be evident to persons of ordinary skill in the art from the foregoing disclosure. The following claims are intended to cover the specific embodiments set forth herein as well as such modifications, variations, and equivalents.

TABLE 1

| | | LENS SYSTEM PRESCRIPTION | | | |
|---|---|---|---|---|---|
| SN | RADIUS | THICKNESS | MATERIAL | CLR. AP. | LENS NO. |
| 1 | ∞ | 0.00000 | | 99.64 | |
| 2 | 147.7706 | 8.30000 | ACRYLIC | 91.14 | L1 |
| 3 | 47.9490 | 48.00000 | | 74.50 | |
| 4 | −116.5760 | 5.00000 | ACRYLIC | 64.39 | L2 |
| 5 | 6789.2319 | 0.33552 | | 64.26 | |
| 6 | 254.8877 | 11.09166 | SF10 | 64.93 | L3 |
| 7 | −726.3653 | 42.28466 | | 65.19 | |
| 8 | 104.6865 | 24.00000 | ACRYLIC | 65.05 | L4 |
| 9 | −132.2950 | 26.74812 | | 62.46 | |
| 10 | −131.2653 | 8.60000 | SF10 | 47.90 | L5 |
| 11 | 135.7989 | 0.90000 | | 47.53 | |
| 12 | 251.3018 | 29.12239 | ACRYLIC | 47.36 | L6 |
| 13 | −60.0909 | 49.46231 | | 57.28 | |
| 14 | ∞ | 5.00000 | K5 | 60.70 | L7 |
| 15 | ∞ | −100.00000 | | 61.34 | |
| 16 | ∞ | 274.98691 | | 47.09 | |

| | | | ASPHERICAL SURFACE DATA | | | |
|---|---|---|---|---|---|---|
| SN | AD | AE | AF | AG | AH | AI | k |
| 2 | 3.4939E-07 | −7.5779E-12 | 6.3058E-15 | −7.5592E-18 | 3.2205E-21 | −2.4317E-25 | 0.0 |
| 4 | −4.0243E-07 | 2.6883E-10 | 9.3864E-14 | −6.0836E-17 | −6.1237E-20 | −4.4125E-23 | −1.0 |
| 5 | −4.2811E-07 | 2.2767E-10 | −1.8110E-14 | −3.0029E-17 | −4.1024E-20 | −4.5638E-23 | 0.0 |
| 8 | −3.8878E-07 | −7.3047E-11 | −6.4535E-14 | 4.1473E-17 | 2.1631E-20 | −3.9818E-23 | 0.0 |
| 12 | −4.8791E-07 | 2.3260E-10 | −3.1838E-13 | 1.5959E-16 | 6.3956E-19 | −7.1293E-22 | 0.0 |

| | ZOOM SPACINGS | | |
|---|---|---|---|
| ZP/SN | 7 | 13 | EFL |
| 1 | 105.3189 | 10.1850 | 96.6610 |
| 2 | 7.0000 | 108.5023 | 186.8710 |
| 3 | 42.2847 | 49.4623 | 139.9860 |

TABLE 2

| | | LENS SYSTEM PRESCRIPTION | | | |
|---|---|---|---|---|---|
| SN | RADIUS | THICKNESS | MATERIAL | CLR. AP. | LENS NO. |
| 1 | ∞ | 0.69681 | | 107.86 | |
| 2 | 100.0000 | 8.30000 | ACRYLIC | 92.14 | L1 |
| 3 | 42.8438 | 28.57154 | | 73.97 | |
| 4 | −110.0461 | 5.00000 | ACRYLIC | 74.03 | L2 |
| 5 | 629.1417 | 0.53389 | | 73.61 | |
| 6 | 82.9746 | 11.09166 | SF56 | 73.71 | L3 |
| 7 | 154.6644 | 43.28071 | | 70.95 | |
| 8 | 143.5025 | 21.50000 | ACRYLIC | 63.52 | L4 |
| 9 | 1314.5530 | 28.69805 | | 61.48 | |
| 10 | −83.7371 | 8.60000 | SF1 | 61.72 | L5 |
| 11 | 277.7317 | 0.30000 | | 68.77 | |
| 12 | 142.3509 | 22.30458 | ACRYLIC | 71.62 | L6 |
| 13 | −65.7208 | 0.30000 | | 74.28 | |
| 14 | 722.7241 | 9.50000 | ACRYLIC | 76.20 | L7 |
| 15 | −149.5103 | 40.32444 | | 77.00 | |
| 16 | ∞ | 5.00000 | K5 | 77.09 | L8 |
| 17 | ∞ | −100.00000 | | 77.15 | |
| 18 | ∞ | 324.99100 | | 75.35 | |

| | | | ASPHERICAL SURFACE DATA | | | |
|---|---|---|---|---|---|---|
| SN | AD | AE | AF | AG | AH | AI | k |

TABLE 2-continued

| | | | | | | | |
|---|---|---|---|---|---|---|---|
| 2 | 5.7724E-07 | 7.3907E-11 | 5.2397E-14 | −2.2704E-17 | 1.0569E-21 | 3.2716E-24 | 0.0 |
| 4 | −4.4325E-07 | −2.7693E-10 | 2.5830E-13 | −9.2185E-17 | −4.4867E-20 | 1.7037E-23 | −1.0 |
| 8 | −3.8400E-07 | −4.1832E-11 | −3.9682E-14 | −4.3311E-17 | −1.2823E-20 | 2.5134E-23 | 0.0 |
| 14 | −2.9190E-07 | −3.9975E-11 | −1.2051E-14 | −5.6163E-18 | 5.8932E-21 | −3.3636E-24 | 0.0 |

ZOOM SPACINGS

| ZP/SN | 7 | 15 | EFL |
|---|---|---|---|
| 1 | 106.6248 | 0.1786 | 96.6628 |
| 2 | 7.8222 | 98.9813 | 186.8890 |
| 3 | 43.2807 | 40.3244 | 139.9930 |

TABLE 3

LENS SYSTEM PRESCRIPTION

| SN | RADIUS | THICKNESS | MATERIAL | CLR. AP. | LENS NO. |
|---|---|---|---|---|---|
| 1 | ∞ | 0.11596 | | 120.22 | |
| 2 | 132.1436 | 8.30000 | ACRYLIC | 105.86 | L1 |
| 3 | 57.8077 | 49.07854 | | 88.90 | |
| 4 | −83.7485 | 5.00000 | ACRYLIC | 84.41 | L2 |
| 5 | 772.3318 | 0.33552 | | 92.36 | |
| 6 | 206.9599 | 11.09166 | SF10 | 95.76 | L3 |
| 7 | −924.9597 | 41.22838 | | 96.36 | |
| 8 | 95.0301 | 21.50000 | ACRYLIC | 99.97 | L4 |
| 9 | −248.3701 | 30.78008 | | 99.28 | |
| 10 | −88.5629 | 8.60000 | SF10 | 91.47 | L5 |
| 11 | 338.0039 | 0.30000 | | 100.69 | |
| 12 | 212.3057 | 29.20260 | SK18 | 103.52 | L6 |
| 13 | −83.6662 | 0.30000 | | 104.87 | |
| 14 | 3349.2141 | 9.50000 | ACRYLIC | 95.39 | L7 |
| 15 | −747.2829 | 39.07597 | | 93.48 | |
| 16 | ∞ | 5.00000 | K5 | 89.64 | L8 |
| 17 | ∞ | −100.00000 | | 89.74 | |
| 18 | ∞ | 274.99890 | | 94.24 | |

ASPHERICAL SURFACE DATA

| SN | AD | AE | AF | AG | AH | AI | k |
|---|---|---|---|---|---|---|---|
| 2 | 2.9965E-07 | 2.8973E-11 | 1.3936E-14 | −8.9923E-18 | 2.9474E-21 | −1.1117E-25 | 0.0 |
| 4 | −6.8870E-07 | 8.0410E-11 | 4.2015E-14 | −4.7154E-17 | −3.2149E-21 | 1.5225E-24 | −1.0 |
| 5 | −3.5344E-07 | 2.0136E-10 | −3.6244E-14 | −4.3459E-17 | −3.7854E-21 | 1.2806E-24 | 0.0 |
| 8 | −1.2643E-07 | −9.5958E-12 | −3.1636E-15 | 5.7683E-18 | −3.2113E-21 | 2.2571E-25 | 0.0 |
| 14 | −3.8316E-07 | −3.6409E-11 | −1.2259E-14 | −1.4381E-18 | 2.2317E-21 | −7.5346E-25 | 0.0 |

ZOOM SPACINGS

| ZP/SN | 7 | 15 | EFL |
|---|---|---|---|
| 1 | 102.3759 | 1.1197 | 96.6657 |
| 2 | 7.0000 | 96.4956 | 186.8980 |
| 3 | 41.2284 | 39.0760 | 139.9990 |

TABLE 4

LENS SYSTEM PRESCRIPTION

| SN | RADIUS | THICKNESS | MATERIAL | CLR. AP. | LENS NO. |
|---|---|---|---|---|---|
| 1 | ∞ | 1.00000 | | 137.13 | |
| 2 | 129.7490 | 14.50000 | POLYSTY | 121.45 | L1 |
| 3 | 1639.0670 | 0.15436 | | 118.96 | |
| 4 | −657.8899 | 5.00000 | ACRYLIC | 118.90 | L2 |
| 5 | 60.8125 | 61.11412 | | 91.83 | |
| 6 | −54.2323 | 8.30000 | ACRYLIC | 81.34 | L3 |
| 7 | −79.2724 | 40.93186 | | 88.71 | |
| 8 | 88.6338 | 22.36147 | ACRYLIC | 96.50 | L4 |
| 9 | −165.1153 | 18.59682 | | 96.36 | |
| 10 | −98.9888 | 9.00000 | POLYSTY | 90.95 | L5 |
| 11 | 138.3304 | 8.11547 | | 98.00 | |
| 12 | 146.5779 | 24.77029 | ACRYLIC | 100.49 | L6 |
| 13 | −73.4081 | 41.24356 | | 100.85 | |
| 14 | ∞ | 5.00000 | K5 | 98.04 | L7 |
| 15 | ∞ | −100.00000 | | 97.72 | |
| 16 | ∞ | 275.00021 | | 113.81 | |

ASPHERICAL SURFACE DATA

| SN | AD | AE | AF | AG | AH | AI | k |
|---|---|---|---|---|---|---|---|
| 2 | 8.3552E-08 | −5.7211E-12 | −4.7404E-16 | 6.1784E-19 | 5.4553E-23 | −4.9177E-26 | −1.0 |
| 3 | 5.9179E-08 | 2.9478E-11 | 2.3708E-15 | −3.2984E-19 | −9.8003E-23 | −7.0219E-29 | −12.0 |
| 4 | 3.5589E-07 | 1.6670E-11 | 1.0435E-15 | 3.1050E-19 | −5.7773E-23 | 4.2700E-26 | 0.0 |
| 7 | −1.9572E-07 | −6.8472E-11 | 9.8730E-18 | −7.6654E-18 | −1.8888E-21 | 1.1968E-24 | 0.0 |
| 8 | −2.0992E-07 | −3.5773E-11 | −1.6740E-14 | 3.0802E-20 | 1.0427E-21 | −2.0784E-25 | 0.0 |
| 11 | 1.9869E-08 | −1.2166E-10 | −3.7602E-14 | −7.4682E-18 | −7.1816E-22 | 3.3144E-25 | −1.0 |
| 12 | −2.8050E-07 | −1.8610E-11 | −6.1007E-15 | −3.0983E-18 | −5.5898E-22 | 6.5688E-26 | 0.0 |

TABLE 4-continued

| | | | | | | |
|---|---|---|---|---|---|---|
| 13 | −7.2624E-08 | 1.6029E-11 | 7.8577E-15 | 3.8900E-18 | 1.4224E-21 | 4.1318E-25 | −1.0 |

ZOOM SPACINGS

| ZP/SN | 7 | 13 | EFL |
|---|---|---|---|
| 1 | 93.7356 | 4.3519 | 99.9999 |
| 2 | 1.3292 | 96.7583 | 200.0000 |
| 3 | 40.9319 | 41.2436 | 140.0000 |

TABLE 5

LENS SYSTEM PRESCRIPTION

| SN | RADIUS | THICKNESS | MATERIAL | CLR. AP. | LENS NO. |
|---|---|---|---|---|---|
| 1 | ∞ | 35.00000 | | 290.22 | |
| 2 | 291.6506 | 14.69100 | ACRYLIC | 210.61 | L1 |
| 3 | 91.5528 | 85.10000 | | 162.98 | |
| 4 | −252.9235 | 8.85000 | ACRYLIC | 149.60 | L2 |
| 5 | 1880.2089 | 0.20000 | | 146.23 | |
| 6 | 201.3033 | 12.00000 | SF56 | 143.92 | L3 |
| 7 | 394.1693 | 73.25182 | | 141.68 | |
| 8 | 195.0503 | 19.00000 | ACRYLIC | 121.39 | L4 |
| 9 | −535.0200 | 72.85547 | | 119.42 | |
| 10 | −123.0726 | 12.00000 | SF5 | 104.56 | L5 |
| 11 | 386.4710 | 0.46806 | | 114.13 | |
| 12 | 359.6228 | 28.00000 | K5 | 115.37 | L6 |
| 13 | −155.1373 | 0.43917 | | 122.36 | |
| 14 | −653.2521 | 21.75465 | ACRYLIC | 127.13 | L7 |
| 15 | −127.7701 | 83.85342 | | 130.90 | |
| 16 | ∞ | 1.50000 | K5 | 143.13 | L8 |
| 17 | ∞ | −145.00000 | | 143.34 | |
| 18 | ∞ | 499.76880 | | 112.81 | |

ASPHERICAL SURFACE DATA

| SN | AD | AE | AF | AG | AH | AI | k |
|---|---|---|---|---|---|---|---|
| 2 | 6.8242E-08 | −1.3550E-13 | 2.6193E-17 | 3.6012E-21 | 4.3287E-26 | −1.9037E-29 | 0.0 |
| 4 | −2.7254E-08 | 7.8741E-13 | 4.8712E-16 | −1.9468E-20 | −6.6543E-24 | 1.2531E-27 | 0.0 |
| | −2.2833E-08 | −2.0492E-12 | 2.9533E-16 | 1.0220E-19 | −7.2719E-23 | 9.9432E-27 | 0.0 |
| 14 | −6.6254E-08 | −3.7817E-13 | 8.2025E-17 | −3.4893E-20 | −1.2778E-23 | 3.0670E-27 | 0.0 |

ZOOM SPACINGS

| ZP/SN | 7 | 15 | EFL |
|---|---|---|---|
| 1 | 187.5544 | 2.3927 | 172.2890 |
| 2 | 9.0000 | 175.5812 | 331.5340 |
| 3 | 73.2518 | 83.8534 | 248.7870 |

TABLE 6

LENS SYSTEM PRESCRIPTION

| SN | RADIUS | THICKNESS | MATERIAL | CLR. AP. | LENS NO. |
|---|---|---|---|---|---|
| 1 | ∞ | 15.00000 | | 193.23 | |
| 2 | 1284.4359 | 14.00000 | LF5 | 181.81 | L1 |
| 3 | 169.8491 | 24.41682 | | 167.34 | |
| 4 | 212.1903 | 34.00000 | BK7 | 172.98 | L2 |
| 5 | −286.4625 | 64.47748 | | 172.75 | |
| 6 | −208.7216 | 9.00000 | ACRYLIC | 160.22 | L3 |
| 7 | 669.6813 | 0.20000 | | 155.91 | |
| 8 | 439.5682 | 11.00000 | ACRYLIC | 156.69 | L4 |
| 9 | 125.8011 | 6.58892 | | 156.70 | |
| 10 | 144.1627 | 14.00000 | SF14 | 161.09 | L5 |
| 11 | 260.0031 | 0.20000 | | 160.83 | |
| 12 | 153.0303 | 24.00000 | ACRYLIC | 164.18 | L6 |
| 13 | 903.3169 | 0.20000 | | 163.64 | |
| 14 | 218.9853 | 25.89357 | BK7 | 159.07 | L7 |
| 15 | −342.6197 | 3.08925 | | 158.24 | |
| 16 | −260.5514 | 14.00000 | SF6 | 158.17 | L8 |
| 17 | −2867.9861 | 88.59519 | | 152.24 | |
| 18 | −371.4034 | 15.00000 | ACRYLIC | 119.10 | L9 |
| 19 | −1102.9470 | −0.66122 | | 122.36 | |
| 20 | ∞ | 489.98550 | | 109.65 | |

ASPHERICAL SURFACE DATA

| SN | AD | AE | AF | AG | AH | AI | k |
|---|---|---|---|---|---|---|---|
| 7 | −3.4433E-08 | −1.7950E-12 | 3.6124E-16 | −1.1122E-19 | 1.3025E-23 | −5.2557E-28 | 0.0 |
| 13 | −1.5099E-08 | −1.5738E-12 | −1.0528E-16 | −5.2941E-25 | −3.1255E-25 | −1.6262E-29 | 0.0 |
| 18 | −1.3605E-07 | −9.4245E-12 | 7.0024E-16 | −3.0411E-19 | 2.0568E-23 | −1.3422E-27 | 0.0 |

ZOOM SPACINGS

| ZP/SN | 5 | 11 | 19 | EFL |
|---|---|---|---|---|
| 1 | 8.5645 | 204.7524 | −149.3006 | 349.995 |

TABLE 6-continued

| | | | | |
|---|---|---|---|---|
| 2 | 64.4775 | 0.2000 | −0.6612 | 699.981 |

TABLE 7

LENS SYSTEM PRESCRIPTION

| SN | RADIUS | THICKNESS | MATERIAL | CLR. AP. | LENS NO. |
|---|---|---|---|---|---|
| 1 | ∞ | −27.48860 | | 40.47 | |
| 2 | 235.6873 | 9.50800 | FK5 | 79.71 | L1 |
| 3 | −433.4475 | 87.81900 | | 76.98 | |
| 4 | −810.5880 | 2.00000 | SK18 | 73.46 | L2 |
| 5 | 63.9254 | 4.46990 | SK6 | 66.39 | L3 |
| 6 | 87.3030 | 0.71320 | | 65.41 | |
| 7 | 69.5601 | 6.29220 | POLYSTY | 61.56 | L4 |
| 8 | 112.1866 | 30.00000 | | 61.80 | |
| 9 | −42.0495 | 4.00000 | SF6 | 66.03 | L5 |
| 10 | −261.2156 | 0.29500 | | 85.83 | |
| 11 | −645.2294 | 27.14260 | ACRYLIC | 91.25 | L6 |
| 12 | −56.4311 | 0.19456 | | 97.32 | |
| 13 | 243.9553 | 59.21634 | ACRYLIC | 125.78 | L7 |
| 14 | −90.5093 | 240.15401 | | 140.58 | |

ASPHERICAL SURFACE DATA

| SN | AD | AE | AF | AG | AH | AI | k |
|---|---|---|---|---|---|---|---|
| 8 | −5.0583E-07 | 2.9906E-10 | −1.7018E-13 | −1.8850E-16 | −3.9000E-20 | 1.6430E-22 | 0.0 |
| 11 | 9.5975E-09 | −1.0386E-11 | −5.2100E-15 | −1.0665E-18 | 4.1320E-22 | 6.1200E-25 | 0.0 |
| 12 | 2.3299E-09 | 8.3416E-11 | 3.2125E-15 | 4.2519E-18 | 2.3713E-21 | 8.5905E-25 | 0.0 |
| 13 | −2.5822E-07 | −9.1341E-12 | −9.2901E-16 | 2.8111E-19 | 2.3000E-22 | −5.5377E-26 | 0.0 |

ZOOM SPACINGS

| ZP/SN | 1 | 3 | 6 | 8 | EFL |
|---|---|---|---|---|---|
| 1 | −80.9854 | 2.2378 | 113.9058 | 54.5465 | 127.001 |
| 2 | −27.4886 | 87.8190 | 0.7132 | 30.0000 | 254.985 |

TABLE 8

| | MATERIAL | $N_e$ | $V_e$ |
|---|---|---|---|
| 1 | POLYSTY | 1.594948 | 30.7 |
| 2 | ACRYLIC | 1.493538 | 57.3 |
| 3 | SF10 | 1.734298 | 28.2 |
| 4 | K5 | 1.524582 | 59.2 |
| 5 | SF56 | 1.791794 | 25.9 |
| 6 | SF1 | 1.723102 | 29.3 |
| 7 | SF10 | 1.734298 | 28.2 |
| 8 | SK18 | 1.641284 | 55.2 |
| 9 | SF14 | 1.768587 | 26.3 |
| 10 | LF5 | 1.584815 | 40.6 |
| 11 | BK7 | 1.518720 | 64.0 |
| 12 | SF6 | 1.812647 | 25.2 |
| 13 | FK5 | 1.489142 | 70.2 |

TABLE 9

| Ex. No. | Q | Pos. | Physical Stop S | Physical Stop Dia. | Operative Stop S | Operative Stop Dist. | Operative Stop Dia. | Entrance Pupil Dist. | Entrance Pupil Dia. |
|---|---|---|---|---|---|---|---|---|---|
| 1 | 1.5 | 1 | 12 | 47.4 | 8 | 13.4 | 35.0 | 275 | 46 |
| | | 2 | 12 | 47.4 | 13 | 11.8 | 46.0 | 275 | 46 |
| 2 | 1.2 | 1 | 15 | 77.0 | 9 | 1.4 | 29.3 | 325 | 50 |
| | | 2 | 15 | 77.0 | 15 | 2.3 | 49.4 | 325 | 50 |
| 3 | 1.4 | 1 | 9 | 99.3 | 8 | 16.8 | 41.9 | 275 | 58 |
| | | 2 | 9 | 99.3 | 14 | 9.2 | 58.9 | 275 | 58 |
| 4 | 1.5 | 1 | 9 | 96.4 | 8 | 5.8 | 41.8 | 275 | 58 |
| | | 2 | 9 | 96.4 | 13 | .0 | 58.9 | 275 | 58 |
| 5 | 1.6 | 1 | 8 | 121.4 | 9 | 24.3 | 77.6 | 500 | 112 |
| | | 2 | 8 | 121.4 | 15 | 31.5 | 111.9 | 500 | 112 |
| 6 | 1.7 | 1 | 13 | 164.6 | 11 | 180.6 | 114.0 | 490 | 110 |
| | | 2 | 13 | 164.6 | 18 | 14.0 | 109.8 | 490 | 110 |
| 7 | 1.5 | 1 | 8 | 61.8 | 6 | 85.1 | 26.2 | infinite | infinite |
| | | 2 | 8 | 61.8 | 3 | 19.2 | 37.5 | infinite | infinite |

What is claimed is:

1. A zoom projection lens system for use with a predetermined illumination means, said system forming a well-corrected, real image of an object and having an optical axis, an entrance pupil, a physical aperture stop which defines the system's numerical aperture, and an operative aperture stop whose location is defined by the intersection with the optical axis of a ray from the illumination means aimed at the center of the entrance pupil, said system comprising:
    (a) at least two lens units each comprising at least one lens element, said at least two lens units being separated by at least one axial space; and
    (b) zoom means for varying the system's magnification between a maximum and a minimum magnification by changing the at least one axial space;
wherein as the zoom means varies the system's magnification between the maximum and minimum magnifications:
    (i) the entrance pupil remains at a substantially fixed position relative to the illumination means over the zoom range;
    (ii) the operative aperture stop moves through at least one lens element surface; and
    (iii) the physical aperture stop and the operative aperture stop are at different locations for at least one magnification between said maximum and minimum magnifications.

2. A zoom projection lens system for use with a predetermined illumination means, said system forming a well-corrected, real image of an object and having an entrance pupil, said system comprising:
    (a) at least two lens units each comprising at least one lens element, said at least two lens units being separated by at least one axial space and including a lens unit nearest the image which has a lens element nearest the image; and
    (b) zoom means for varying the system's effective focal length between a maximum and a minimum value by changing the at least one axial space;
wherein the system has a Q-value greater than about 1.0, where the Q-value is defined by:

$$Q = (EFL_{max} * \theta)/(CA * f/no * L)$$

and where $EFL_{max}$ is the maximum value of the system's effective focal length, $\theta$ is the semi-angular coverage in degrees at the system's minimum effective focal length, CA is the clear aperture of the lens element nearest the image, f/no is the distance from the object to the system's entrance pupil divided by the diameter of the entrance pupil for entrance pupils located a finite distance from the object and f/no is one over two times the numerical aperture determined by the illumination means for entrance pupils located an infinite distance from the object, and L is the number of lens elements in the system which have optical power or correct aberrations.

3. The zoom projection lens system of claim 2 wherein the Q-value is greater than about 1.5.

4. The zoom projection lens system of claim 1, 2, or 3 wherein the at least two lens units comprise from the object side, a positive zooming unit and a negative compensating unit.

5. The zoom projection lens system of claim 4 wherein the negative compensating unit comprises two negative lens elements and one positive lens element.

6. The zoom projection lens system of claim 4 wherein the positive zooming unit comprises two positive lens elements and one negative lens element.

7. The zoom projection lens system of claim 4 wherein the negative compensating unit comprises one positive element and the positive zooming unit comprises one negative element.

8. The zoom projection lens system of claim 1, 2, or 3 wherein the at least two lens units comprise from the object side, a first unit which is positive, a second zooming unit which is negative, and a third unit which is positive.

9. The zoom projection lens system of claim 8 wherein the third unit is fixed during zooming.

10. The zoom projection lens system of claim 8 wherein the first unit has an inverted telephoto structure.

11. The zoom projection lens system of claim 8 wherein the third unit comprises a positive lens element and a negative lens element.

12. The zoom projection lens system of claim 1, 2, or 3 wherein the at least two lens units comprise from the object side, a first fixed unit which is positive, a second unit which is positive, a third zooming unit which is negative, and a fourth unit which is positive.

13. The zoom projection lens system of claim 12 wherein the second and fourth units are each composed of a single positive lens element.

14. The zoom projection lens system of claim 12 wherein the third zooming unit comprises a positive lens element and a negative lens element.

15. The zoom projection lens system of claim 1, 2, or 3 including at least one aspheric surface.

16. The zoom projection lens system of claim 1, 2, or 3 including at least one lens element formed of a polymeric material.

17. A method for producing a zoom projection lens system for use with illumination means which produces an output at a predetermined location, said system producing a well-corrected, real image of an object and having an optical axis and an entrance pupil, said method comprising:

(a) designing the zoom projection lens system by:

(1) specifying at least two lens units which are separated by at least one axial space and which each comprise at least one lens element, said at least one axial space being variable so as to change the system's magnification between a maximum and a minimum magnification;

(2) specifying the location of the system's entrance pupil to be substantially the same as the location of the output of the illumination means over the system's zoom range; and (3) not specifying the location of the system's physical aperture stop which defines the system's numerical aperture;

whereby the system has an operative aperture stop whose location is defined by the intersection with the optical axis of a ray from the illumination means aimed at the center of the entrance pupil, said location moving through at least one lens surface as the system's magnification varies between the maximum and minimum magnifications; and (b) producing the zoom projection lens system designed in step (a).

18. The method of claim 17 wherein step (a) is performed with a lens design computer program by specifying that the aperture stop called for by the program is located in object space or image space.

19. The method of claim 18 wherein the lens design computer program uses calculation surfaces and the aperture stop is specified to be in object or image space by means of a negative spacing between two of said calculation surfaces.

20. A method for producing a zoom projection lens system for use with illumination means which produces an output at a predetermined location, said system producing a well-corrected, real image of an object and having an optical axis and a entrance pupil, said method comprising:

(a) designing the zoom projection lens system by:

(1) specifying at least two lens units which are separated by at least one axial space and which each comprise at least one lens element, said at least one axial space being variable so as to change the system's magnification between a maximum and a minimum magnification; and (2) specifying the location of the system's entrance pupil to be substantially the same as the location of the output of the illumination means over the system's zoom range by specifying the location of a pseudo-aperture stop which is in the system's object or image space and has the same location as the output of the illumination means;

whereby the system has an operative aperture stop whose location is defined by the intersection with the optical axis of a ray from the illumination means aimed at the center of the entrance pupil, said location moving through at least one lens surface as the system's magnification varies between the maximum and minimum magnifications; and (b) producing the zoom projection lens system designed in step (a).

21. The method of claim 20 wherein step (a) is performed with a lens design computer program which uses calculation surfaces and the pseudo-aperture stop is specified to be in the system's object or image space by means of a negative spacing between two of said calculation surfaces.

22. The method of claim 17 or 20 wherein the at least two lens units comprise from the object side, a positive zooming unit and a negative compensating unit.

23. The method of claim 22 wherein the negative compensating unit comprises two negative lens elements and one positive lens element.

24. The method of claim 22 wherein the positive zooming unit comprises two positive lens elements and one negative lens element.

25. The method of claim 22 wherein the negative compensating unit comprises one positive element and the positive zooming unit comprises one negative element.

26. The method of claim 17 or 20 wherein the at least two lens units comprise from the object side, a first unit which is positive, a second zooming unit which is negative, and a third unit which is positive.

27. The method of claim 26 wherein the third unit is fixed during zooming.

28. The method of claim 26 wherein the first unit has an inverted telephoto structure.

29. The method of claim 26 wherein the third unit comprises a positive lens element and a negative lens element.

30. The method of claim 17 or 20 wherein the at least two lens units comprise from the object side, a first fixed unit which is positive, a second unit which is positive, a third zooming unit which is negative, and a fourth unit which is positive.

31. The method of claim 30 wherein the second and fourth units are each composed of a single positive lens element.

32. The method of claim 30 wherein the third zooming unit comprises a positive lens element and a negative lens element.

33. The method of claim 17 or 20 including at least one aspheric surface.

34. The method of claim 17 or 20 including at least one lens element formed of a polymeric material.

35. The zoom projection lens system of claim 1, 2, or 3 wherein the entrance pupil is located at an infinite distance from the object.

36. The zoom projection lens system of claim 35 wherein the object is a LCD panel.

* * * * *